US006368011B1

(12) United States Patent
LaFountain et al.

(10) Patent No.: US 6,368,011 B1
(45) Date of Patent: Apr. 9, 2002

(54) SIGN BOX JOINING DEVICE

(75) Inventors: Steven LaFountain, Venice; K. Blair Milliken, Englewood, both of FL (US)

(73) Assignee: Milliken Industries, Englewood, FL (US)

( * ) Notice: Subject to any disclaimer, the term of this patent is extended or adjusted under 35 U.S.C. 154(b) by 0 days.

(21) Appl. No.: 09/300,908

(22) Filed: Apr. 28, 1999

(51) Int. Cl.[7] .............................................. G09F 13/00
(52) U.S. Cl. ........................ 403/363; 403/335; 40/549
(58) Field of Search ................... 40/549, 572; 403/219, 403/335, 336, 338, 340, 341, 363, 381; 174/101, 68.3, 72 R, 95, 97; 256/59

(56) References Cited

U.S. PATENT DOCUMENTS

| | | | | |
|---|---|---|---|---|
| 1,681,830 A | * | 8/1928 | White | 403/335 |
| 2,296,782 A | * | 9/1942 | Fischer et al. | 403/335 |
| 3,390,259 A | * | 6/1968 | Angier | 40/549 |
| 3,391,481 A | * | 7/1968 | Lloyd | 40/549 X |
| 3,835,613 A | * | 9/1974 | Davies, Jr. | 40/549 X |
| 3,848,349 A | * | 11/1974 | Olsen | 40/549 X |
| 4,220,316 A | * | 9/1980 | Naka et al. | 256/59 |
| 4,265,039 A | | 5/1981 | Brooks | 40/603 |
| 4,380,880 A | * | 4/1983 | Gandy | 40/572 X |
| 4,674,213 A | | 6/1987 | Keithley | 40/603 |
| 4,690,192 A | | 9/1987 | Stilling | 160/67 |
| 4,710,853 A | * | 12/1987 | Reinhardt | 361/391 |
| 4,905,390 A | * | 3/1990 | Stilling | 40/549 |
| 4,926,605 A | | 5/1990 | Milliken et al. | 52/63 |
| 5,014,478 A | | 5/1991 | Spring | 52/281 |
| 5,078,530 A | * | 1/1992 | Kim | 403/338 X |
| 5,272,282 A | * | 12/1993 | Wiesemann | 174/101 |
| 5,343,646 A | | 9/1994 | Cobb et al. | 40/585 |
| 5,347,736 A | | 9/1994 | Kanigan | 40/576 |
| 5,621,994 A | | 4/1997 | Cobb et al. | 40/782 |
| 5,881,508 A | | 3/1999 | Irvine et al. | 52/177 |
| 5,924,260 A | * | 7/1999 | Austin et al. | 403/363 X |
| 6,112,444 A | * | 9/2000 | Milliken et al. | 40/572 X |

FOREIGN PATENT DOCUMENTS

| CA | 1090639 | * 12/1980 | 256/59 |
|---|---|---|---|

* cited by examiner

Primary Examiner—Lynne H. Browne
Assistant Examiner—David E. Bochna
(74) Attorney, Agent, or Firm—Dann, Dorfman, Herrell & Skillman, P.C.

(57) ABSTRACT

A sign box joining device for slidable engaging and interlocking with at least one extrusion member. The joining device having an elongate, flat, top wall having downwardly extending side walls at opposite sides of the top wall and inwardly extending bottom wall flanges at bottom ends of the downwardly extending side walls. The extrusion member includes an elongate, flat, bottom wall having upwardly extending side walls at opposite sides of the bottom wall, one upwardly extending side wall having an inwardly extending top wall and the other upwardly extending side wall having and outwardly extending top wall. The joining device slidably engages and interlocks the pair of extrusion members when a portion of the top wall is in contact with a portion of the inwardly extending top wall of both extrusion members. A portion of each of the downwardly extending side walls is in contact with a portion of opposite upwardly extending side walls of both extrusion members, and a portion of the inwardly extending walls is in contact with a portion of one of the bottom walls of the extrusion members.

26 Claims, 7 Drawing Sheets

FIG. 9

SIGN BOX JOINING DEVICE

FIELD OF THE INVENTION

The present invention relates generally to a device for joining two or more surfaces, and more particularly to a joining device for joining two or more extrusion members of a sign box.

BACKGROUND OF THE INVENTION

In the past, it is known to have a sign box with illuminated signs having a rectangular housing containing a light source typically in the form of one or more fluorescent tube bulbs. The sign faces may be in the form of a single, translucent sheet, painted or marked as desired, or the sign face may be divided into a number of horizontal rows to receive interchangeable panels bearing alphanumeric characters or other symbols.

A rectangular sign box is suited for mounting a sign in front of a row (or rows) of fluorescent tubes that most commonly constitute the interior source of illumination. Moreover, the cabinet-type framework accommodates a weatherproof internal raceway in which lamp ballasts and connecting wiring may be disposed. Whatever the interior construction, the framework must be extremely rugged to support the weight of larger signs and to withstand gale winds.

Although the rectangular sign box housing or cabinet continues to be used, there are significant problems associated with the size of the sign box and its ease of construction and assembly. Several unsuccessful attempts have been made in the past to address the need for a box having alternate shapes and sizes that are easy assembly and construct at a reasonable cost.

For example, large signs must be strong and rugged. Accordingly, they have long been known to be fabricated of steel or aluminum frameworks. Either angle or channel members are employed to form inwardly facing U-shaped channels which are mitered or otherwise joined successively one to the next in order to form a rectangular cabinet. Combinations of slots, ledges, clamps and the like have then been used to secure the rigid panels, that form the display faces, to the resulting framework.

More successful improvements in sign framework construction have been made in recent years through the use of aluminum extrusions to form the cabinet and the mounting components for display faces. A leading example of such improvements is to be found in the disclosure of U.S. Pat. Nos. 4,926,605 and 5,647,1.

Extruded sign box members are typically made from a primary extrusion that is used to form all four sides of a sign cabinet, including the provision of a weather-resistant and accessible wiring raceway. On the past a sign box extrusion has been joined to another through the use of internal steel structural supports causing large and unsightly gaps between the two or more extrusion members. Sometimes these gaps are covered with additional applications of thin metal sheets which are known to require considerable labor and materials for assembly. A combination of a groove and a shelf defined on a sidewall of the extrusion may be used in several different ways to hang and/or hold the marginal edge portions of a rigid plastic display face.

A significant undesirable limitation of prior sign box construction is that the depth of the primary extrusion forming the sign box is dictated by the limitations associated with the extrusion process. Typically, extrusions are limited in width to 14 inches, and more typically to 6 and 12 inch widths. An extrusion is limited by the physical limitations of die size and extrusion press capacity. Accordingly, this deficiency also limits the size and depth of the sign construction.

Accordingly, a new type of sign box construction allowing for more flexible size and depth using existing extrusion components is needed. Further, the new sign box construction must produce a strong framework and support for the sign material at a minimized cost.

SUMMARY OF THE INVENTION

The present invention solves many of the problems by association with conventional sign boxes by providing a joining device that makes it possible to join two or more sign box extrusions or entire cabinets to create a finished sign box with a shape, size and depth as may be desired. The sign box in accordance with the present invention includes a very clean and uniform appearance relative to the outer surfaces of the sign box without the need for expensive new extrusion materials. Further, since standard sign box extrusion forms can be used, more efficient and cost-effective use of existing materials can be achieved to produce a more attractive and desirable sign box.

In accordance with the present invention a sign box joining device is provided in the form of an elongated member having a c-shaped cross section. The sign box joining device includes an elongated, flat, first top wall and a pair of elongate downwardly extending side walls integral to opposite sides of the first top wall, the side walls being substantially parallel to one another and being at right angles to the first top wall. The side walls may include flat, curvilinear, and other complex shapes as required to mate with the extrusion member. In addition the relationship of the side walls with the top wall may be other than perpendicular. Further, the side walls need not be parrallel to each other or have the same shape as, or be mirror images of the other. In addition, each side walls may be double sided. The joining device conformably fills the space formed by mating extrusion members such that the joining device engages and interlocks the extrusion members togther.

The invention also includes a method for joining a sign box, having the steps of mating a pair of elongated extrusion members so that a space having a predetermined shape is formed therebetween. The method also including at least partially filling the predetermined space formed between the elongated extrusion members with a joining member having a shape at least partially corresponding to the predetermined shape formed between the elongated extrusion members.

More specifically, the joining device includes an elongated, flat, first top wall having a pair of elongate downwardly extending side walls that are integral to opposite sides of the first top wall. The side wall may also be flat as required. The downwardly extending side walls are parallel to one another and at right angles to the top wall. The downwardly extending side walls include a pair of elongate, inwardly extending bottom wall flanges integral to the bottom ends of the downwardly extending side walls. The inwardly extending bottom wall flanges extend toward one another generally parallel to the first top wall and at right angles to the downwardly extending side walls.

The sign box joining device slidably engages and interlocks at least one extrusion member of a sign box to form a sign box assembly in accordance with the present invention. Each extrusion member of the sign box has an elongate, flat bottom wall having a first and a second elongate, flat, upwardly extending side wall. The upwardly extending side walls are integral to opposite sides of the bottom wall. The upwardly extending side walls are parallel to one another and at right angles to the bottom wall.

One upwardly extending side wall includes an elongate, flat, inwardly extending top wall integral to a distal free end of the respective side wall. The inwardly extending top wall extends in parallelism to the bottom wall at a right angle to the respective side wall. The other upwardly extending side wall has an elongate, flat, outwardly extending top wall integral to a distal free end of the respective side wall. The outwardly extending top wall extends in parallelism to the bottom wall and at a right angle to the respective side wall. However, it is understood that the side walls, outwardly and inwardly extending walls may have any angular relationship to each other as required to mate with an extrusion member.

The joining device slidably engages and interlocks at least one of the extruded members when a portion of the top wall, one downwardly extending side wall and one inwardly extending bottom wall of the joining device is in contact respectively with a portion of the inwardly extending top wall, one the upwardly extending side walls and the bottom wall of the extrusion member.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
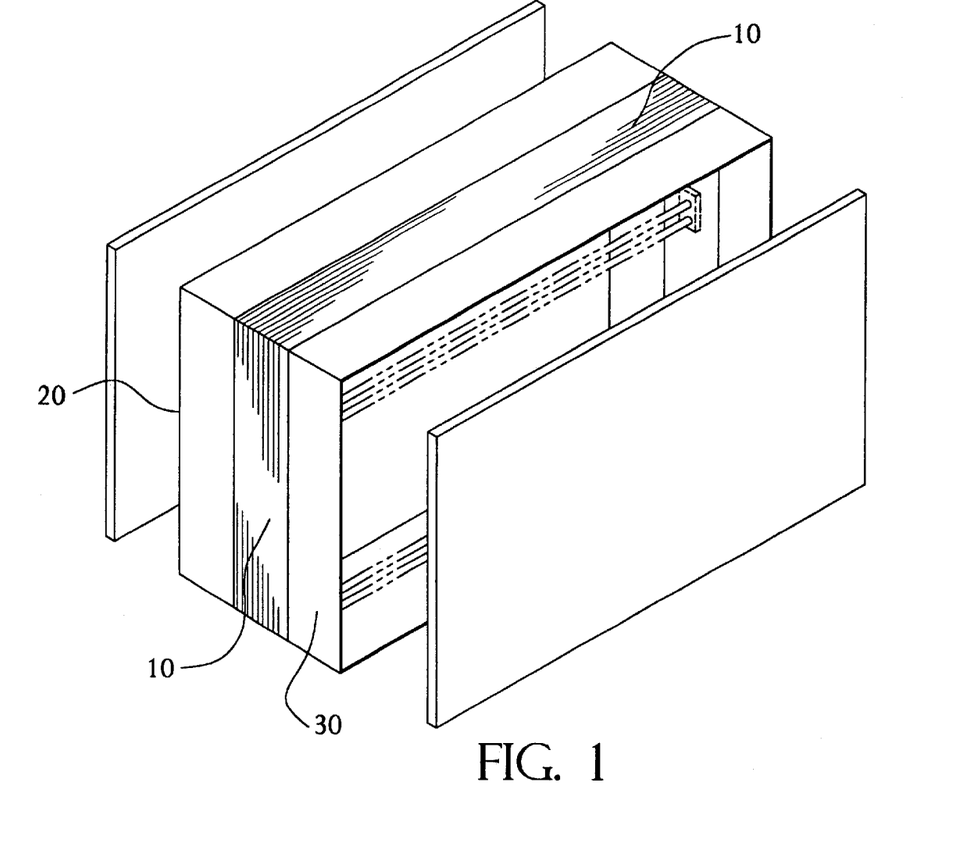
FIG. 1 is an illustration of a sign box showing a joining device according to the present invention.

Referring to the drawings, where like elements are identified by like numerals, there is shown in FIG. 1 a sign box joining device 10 for slidable engaging and interlocking with at least one extrusion member 20,30.

Figure 2:
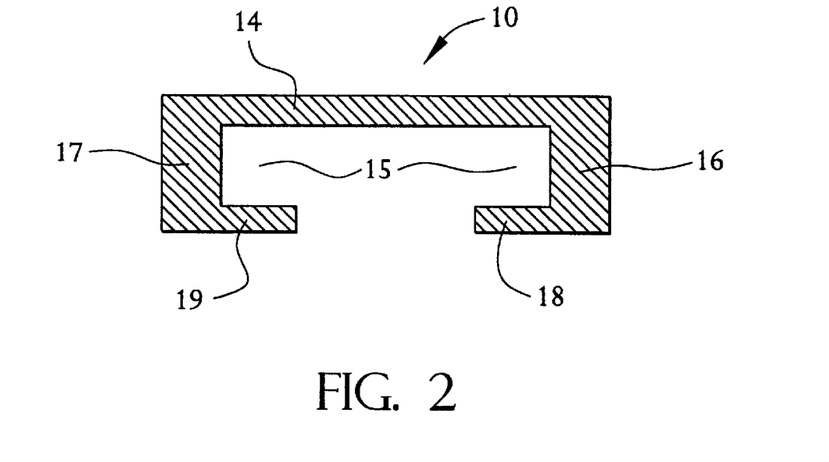
FIG. 2 is a cross-section view of a joining device according to the present invention.

Referring to FIG. 2, the joining device 10 having an elongate, flat, top wall 14 with downwardly extending side walls 16,17 at opposite sides of the top wall 14 and inwardly extending bottom walls 18,19 at distal ends of the downwardly extending side walls 16,17. The extending side walls 16,17 and inwardly extending bottom walls 18,19 togther form joining device cavities 15 and opposite ends of the joining device 10.

Figure 3:
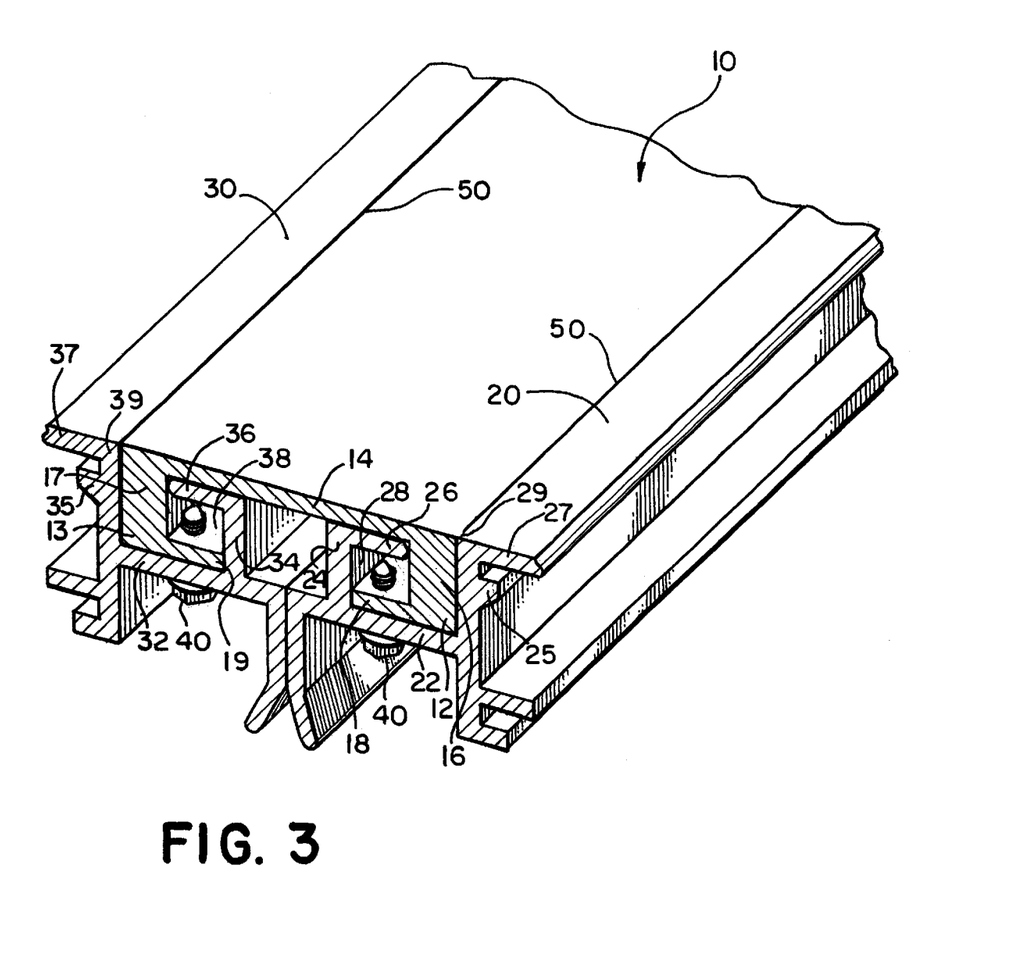
FIG. 3 is a projection view in cross-section of a sign box assembly including a joining device according to the present invention.

Referring to FIG. 3, the extrusion members 20,30 have an elongate, flat, bottom wall 22,32 with upwardly extending side walls 24,25,34,35 integral to opposite sides of the bottom wall 22,32. One of the upwardly extending side walls 24,34 has an inwardly extending top wall 26,36 forming an extrusion member cavity 28,38. The other upwardly extending side wall 25,35 has an outwardly extending top wall 27,37.

The joining device 10 slidably engages and interlocks a pair of extrusion members 20,30 when a portion of the top wall 14 is in contact with a portion of the inwardly extending top wall 26,36 of both extrusion members 20,30. A portion of each of the downwardly extending side walls 16,17 is in contact with a portion of opposite upwardly extending side walls 25,35 of both extrusion members 20,30. In addition, a portion of the inwardly extending walls 18,19 of the joining device 10 is in contact with a portion of one of the bottom walls 22,32 of the extrusion members 20,30.

Referring to FIG. 3, in another aspect of the invention a sign box joining device 10 includes an elongate, flat, first top wall 14 and a first and a second elongate, flat, forwardly extending side wall 16,17 integral to opposite sides of the first top wall 14. The first and second side walls 16,17 are parallel to one another and at right angles to the first top wall 14.

The joining device 10 also includes a first and a second elongate, flat, inwardly extending bottom walls 18,19 integral to respective distal free ends 12,13 of the first and second side walls 16,17 of the joining device 10. However, it is understood that the inwardly extending bottom walls 18,19 can also have a curvilinear or some other complex shape. The inwardly extending first and second bottom walls 18,19 extend toward one another in parallelism to the first top wall 14 and at right angles to the first and second side walls 16,17.

The sign box joining device 10 slidably engages and interlocks with a first extrusion member 20. The first extrusion member 20 includes an elongate, flat, third bottom wall 22 and a third and a fourth elongate, flat, forwardly extending side walls 24,25 integral to opposite sides of the third bottom wall 22. The third and fourth side walls 24,25 are parallel to one another and are at right angles to the third bottom wall 22. The first extrusion member 20 includes also includes an elongate, flat, inwardly extending second top wall 26 that is integral to a respective distal free end 23 of the third side wall 24. The inwardly extending second top wall 26 extends in parallelism to the third bottom wall 22 and at right angle to the third side wall 24.

The first extrusion member 20 further includes an elongate, flat, outwardly extending third top wall 27 that is integral to a respective distal free end 29 of the fourth side wall 25. The outwardly extending third top wall 27 extends in parallelism to the third bottom wall 22 and at right angle to the fourth side wall 25. A portion of first bottom wall 18 of the joining device 10, as well as a portion of the first side wall 16 and a portion of the first top wall 14 of the joining device 10 slidably engage and interlock with a portion of the third bottom wall 22, the fourth side wall 25, the inwardly extending second top wall 26 of the first extrusion member 20. Although it is preferred that the joining device 10 slidably engage and interlock the first extrusion member 20, it is understood that these components may be assembled in alternate ways such as hinging in place or snapping in place.

The first extrusion member 20 may include a fastener 40 for fastening the first extrusion member 20 with the joining device 10. Although a simple screw bolt 40 is shown as in FIG. 3, it is understood that the fastener 40 can be of any type including, but not limited to, a screw, rivet, adhesive, weld, or crimp attachment. Further, it is also understood that the fastener 40 may be located on either the joining device 10 or one or both of the extrusion members 20,30.

In one aspect of the invention, the first top wall 14 of the joining device 10 and the outwardly extending third top wall 27 of the first extrusion member 20 have an outer surface located in substantially the same plane. Accordingly, the first top wall 14 and the outwardly extending third top wall 27 form a flat, continuous, flush finished surface having a seam 50. Although it is preferred that the outer surface of the first top wall 14 and the outwardly extending third top wall 27 are flat and flush with respect to each other, it is understood that these surfaces can be made to accommodate other forms including curvilinear surfaces and stepped surfaces.

When the joining device 10 is interlocked with the first extrusion member 20, the first side wall 16 of the joining device 10 may substantially abut the fourth sidewall 25 of the first extrusion member. In addition, the first side wall 16 of the joining device 10 may only partially abut the fourth sidewall 25 of the first extrusion member.

The sign box joining device 10 may also engage and interlock with a second extrusion member 30. The second extrusion member 30 includes an elongate, flat, fourth bottom wall 32 with a fifth and a sixth elongate, flat, forwardly extending side walls 34,35 integral to opposite sides of the third bottom wall. The fifth and sixth side walls 34,35 are parallel to one another and are at right angles to the fourth bottom wall 32.

The fifth side wall 34 includes an elongate, flat, inwardly extending fourth top wall 36 integral to a respective distal free end 33 of the fifth side wall 34, The inwardly extending fourth top wall 36 extends in parallelism to the fourth bottom wall 32 and at right angle to the fifth side wall 34.

The sixth side wall 35 includes an elongate, flat, outwardly extending fifth top wall 37 integral to a respective distal free end 39 of the sixth side wall 35. The outwardly extending fifth top wall 37 extends in parallelism to the fourth bottom wall 32 and at right angle to the sixth side wall 35.

A portion of each of the second bottom wall 19 of the joining device 10, as well as a portion of the second side wall 17 and top wall 14 of the joining device 10 slidably engage and interlock with a portion of corresponding components of the second extrusion member 30, respectively, the fourth bottom wall 32, the sixth side wall 35, and the inwardly extending fourth top wall 36 of the second extrusion member 30.

Figure 8:
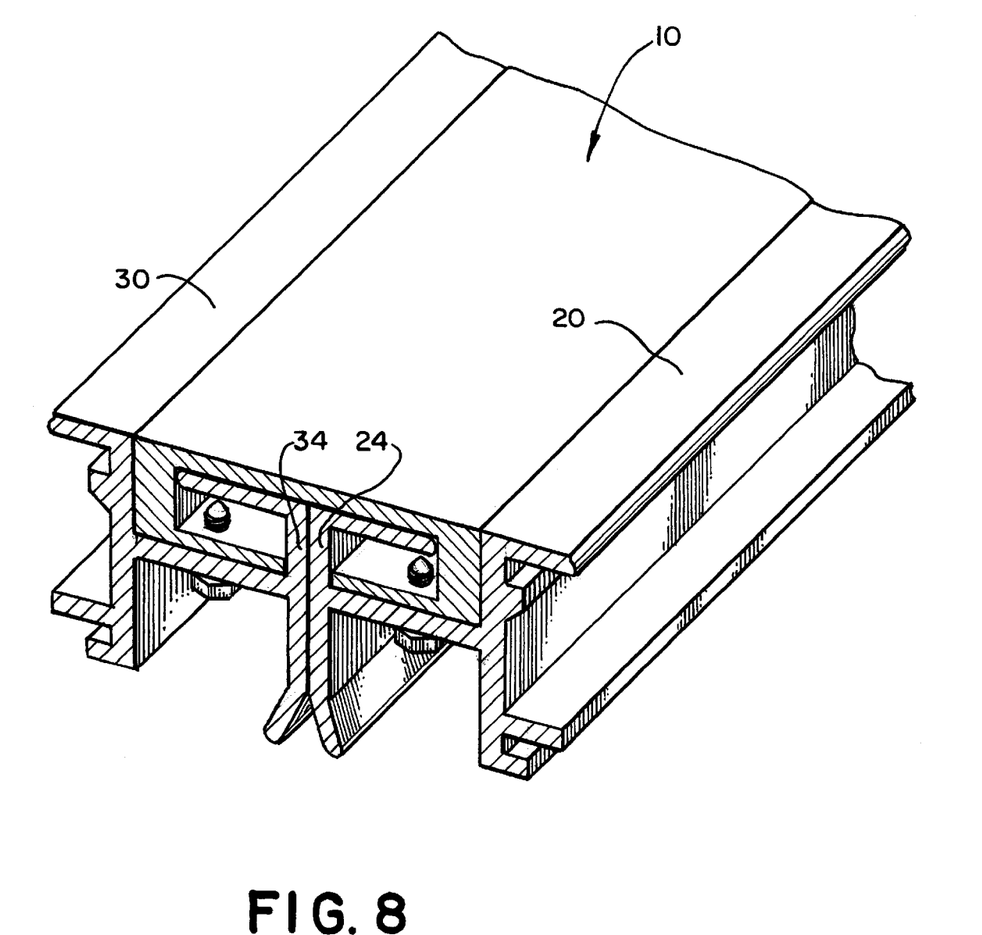
FIG. 8 is a projection view in cross-section of a sign box assembly including an alternate joining device according to the present invention.

When the joining device 10 joins two extrusion members 20,30, a portion of the third and fifth side walls 24,34 of the first and the second extrusion members 20,30 may abut against each other, as shown in FIG. 8. In addition, the third and fifth sidewalls 24,34 of the first and the second extrusion members 20,30 each may include an outwardly extending surface 27,37 that may abut against each other.

Further, the top wall 14 of the joining device 10 and the outwardly extending fifth top wall 37 may each have an outer surface located in substantially the same plane. Accordingly, the first top wall 14, the third op wall 27, and the fifth top wall 37 may each have an outer surface located in substantially the same plane forming a smooth continuous flat surface. In addition, the smooth continuous may be separated by a seam 50.

Figure 4:
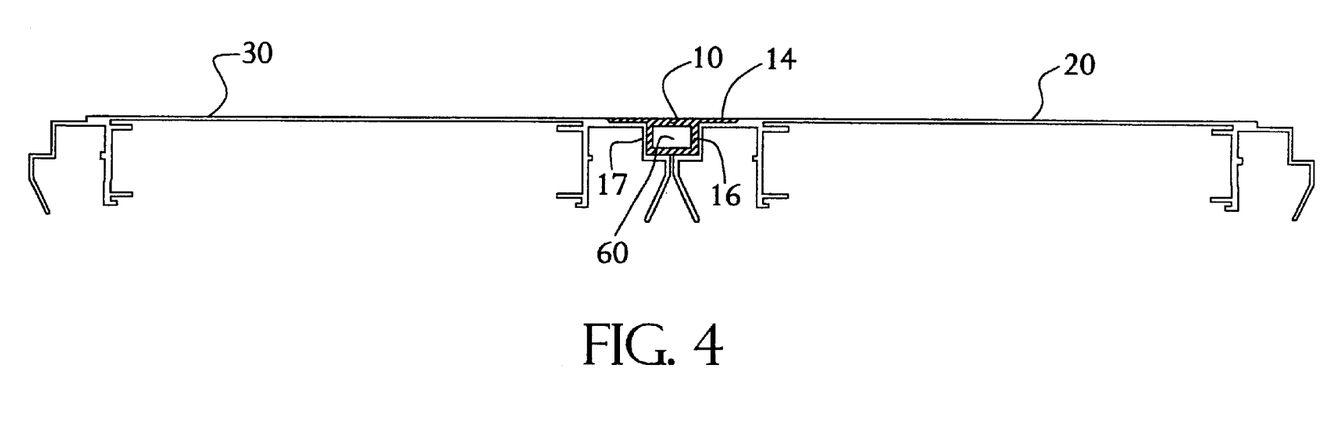
FIG. 4 is a cross-section view of an alternate joining device according to the present invention.
Figure 5:
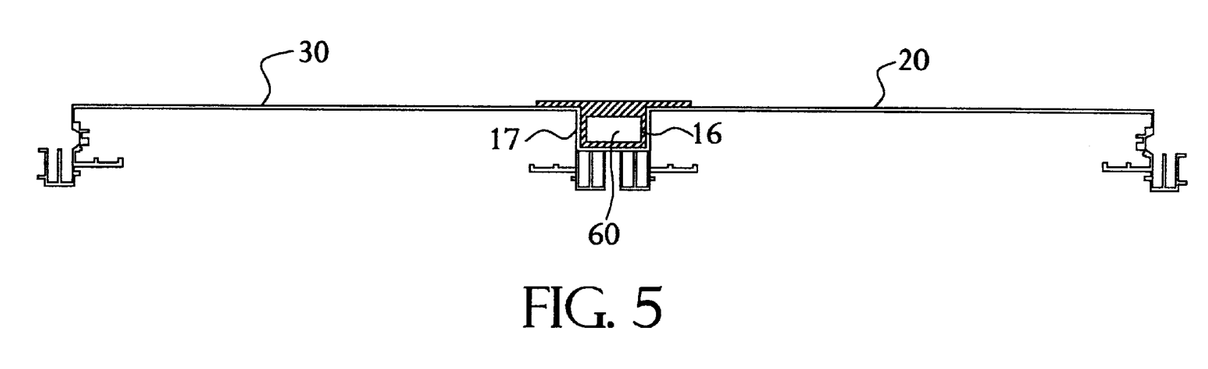
FIG. 5 is a cross-section view of an alternate joining device according to the present invention joining a pair of extrusion members.
Figure 6:
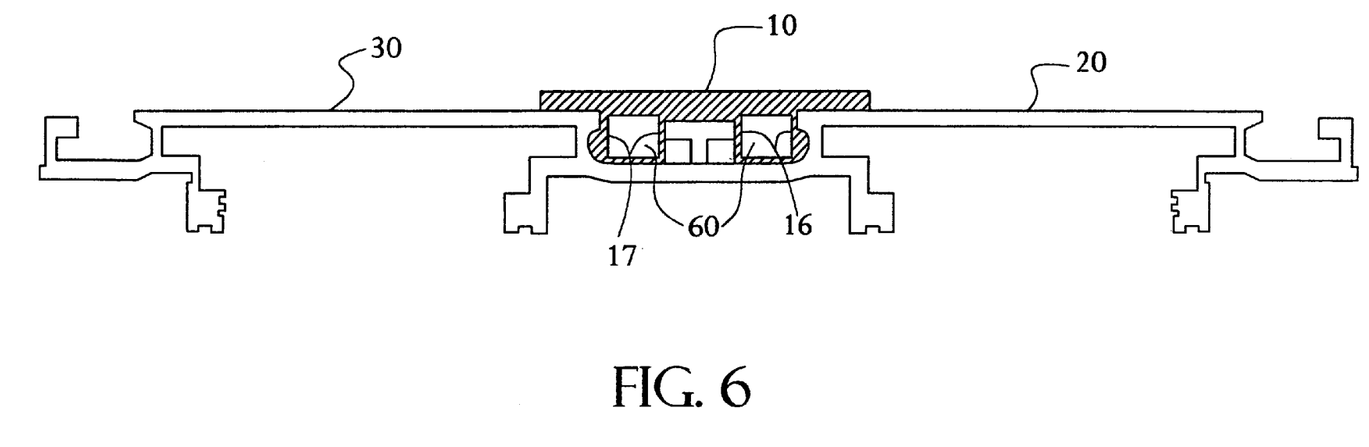
FIG. 6 is a cross-section view of an alternate joining device according to the present invention joining a pair of extrusion members.

Referring to FIGS. 4–6, the sign box joining device 10 may also include an elongated, flat, first top wall 14 having a pair of elongate, flat, downwardly extending side walls 16,17 that are integral to opposite sides of the first top wall 14. The side walls 16, 17 being substantially parallel to one another and being at right angles to the first top wall 14. The joining device 10 conformably fills the space 60 formed by mating extrusion members 20,30. The joining device 10 engages and interlocks the extrusion members 20,30 togther.

Figure 9:
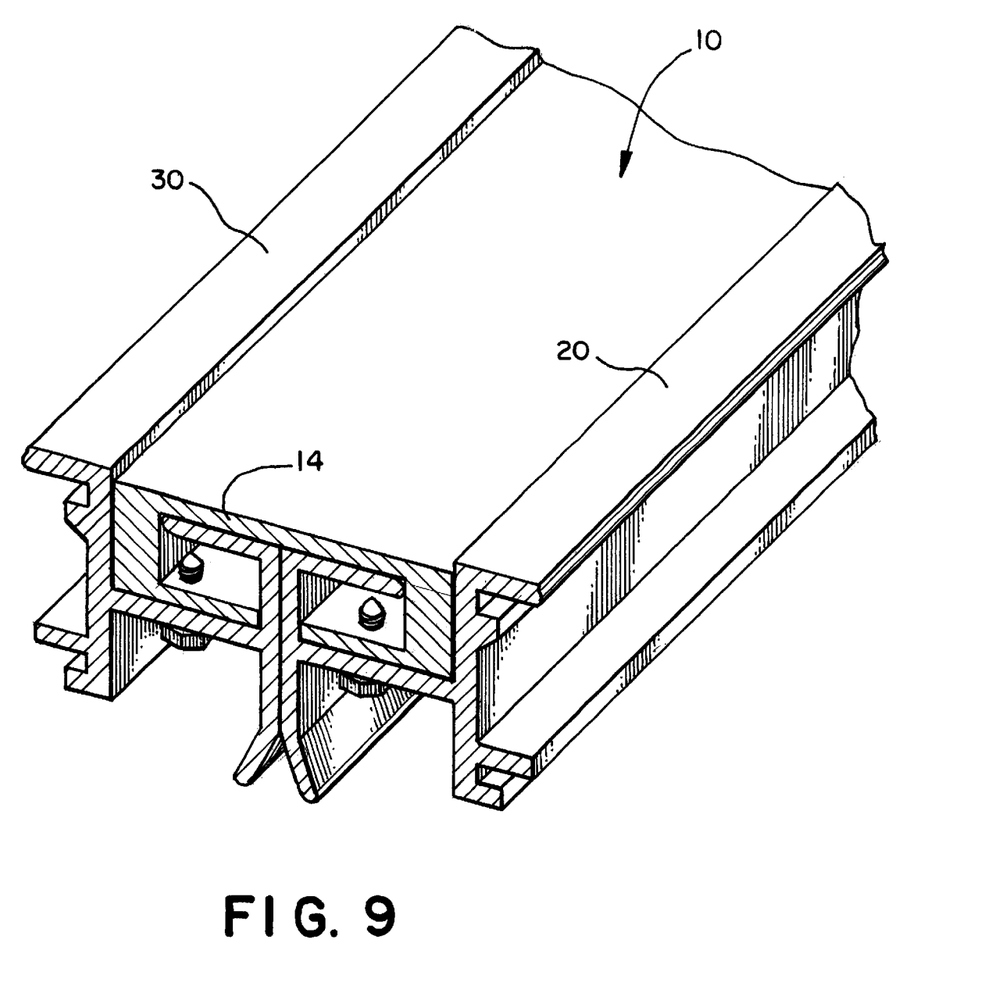
FIG. 9 is a projection view in cross-section of an alternate joining device according to the present invention joining a pair of extrusion members.

The sign box joining device 10 may include mating extrusion members 20,30 that are co-extensive. In addition, the downwardly extending side walls 16,17 are made to have a predetermined shape to engage the side walls of an extrusion member having a corresponding predetermined shape. Further, the first top wall 14 may have an outer surface that forms a conformal coplanar surface with the outer surface of mating co-extensive extrusion members 20,30. Although it is preferred that the outer surface of the joining device 10 and the extrusion member 20,30 be conformal and coplanar, it is understood that this is not the only form of the present invention. For example, FIG. 6 shows a joining member 10 having a top wall 14 with an outer surface above the outer surface of the extrusion members 20,30. FIG. 9 shows a joining member 10 having a top wall 14 with an outer surface recessed below the outer surface of the extrusion members 20,30. These and other variations of the present invention are contemplated along with the examples of the invention described herein.

The invention also includes a method for joining a sign box having the steps mating a pair of elongated extrusion members 20,30 so that a space having a predetermined shape 60 is formed therebetween. The predetermined shape 60 is then least partially filled with a joining member 10 having a shape at least partially corresponding to the predetermined shape 60 formed between the elongated extrusion members 20,30.

The method includes the additional step of engaging the elongated extrusion members 20,30 with the joining member. In addition the method includes interlocking the elongated extrusion members 20,30 with the joining member 10 with a fastener (not shown).

Is to be understood that the shape of the joining member 10 may be at least be partially pre-determined by the shape of commercially available extrusion members manufactured by, but not limited to, Milliken Industries, Signtech, Ashley Cameron and Eastern.

Figure 7:
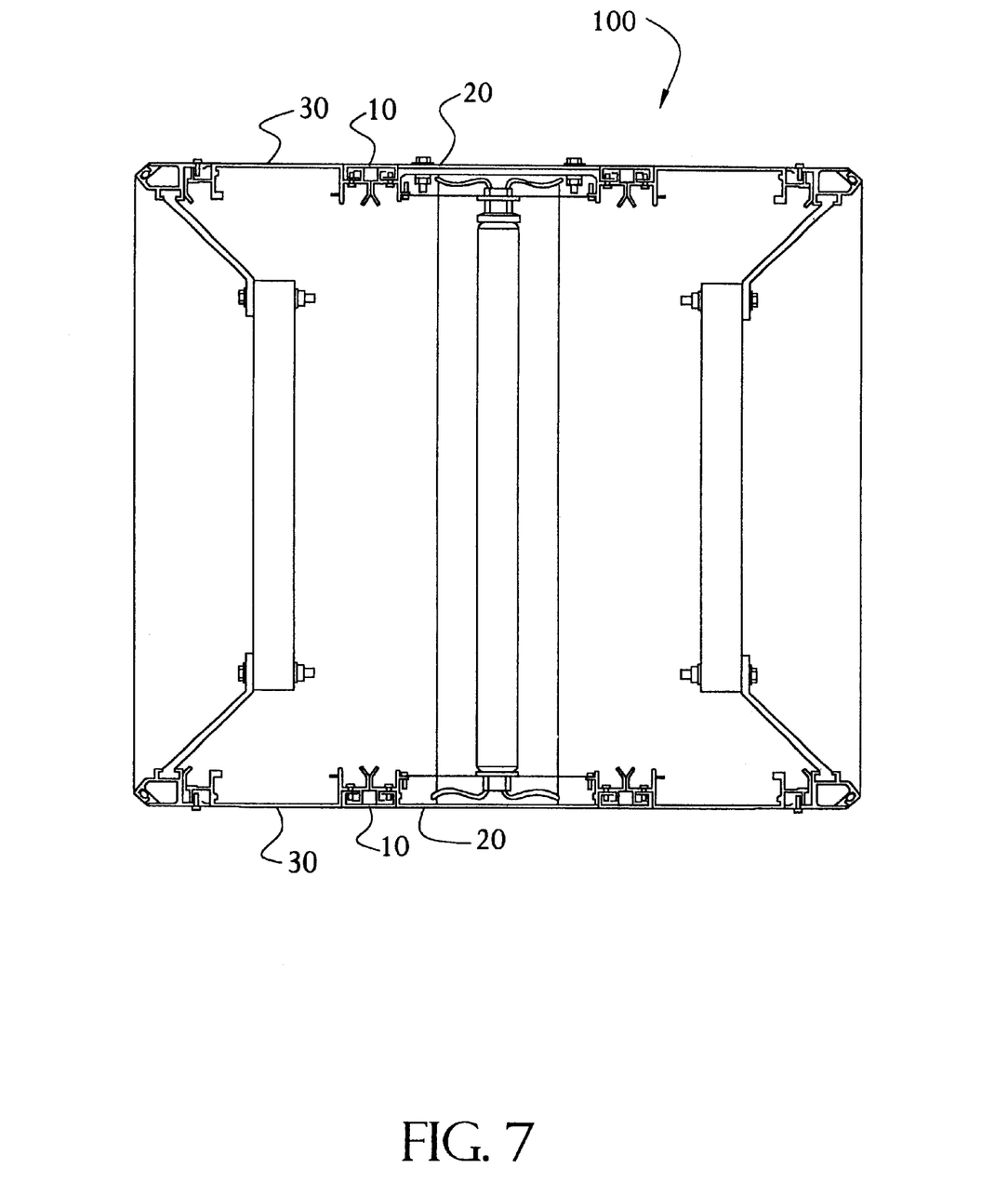
FIG. 7 is a cross-section view of a sign box fabricated with a joining device and extrusion members according to the present invention.

Referring to FIG. 7, a sign box 100 can be easily fabricated with a joining device 10 and a pair of extrusion members 20,30. However, it is understood that a sign box may be fabricated with a single joining device 10 and one extrusion member 20. The depth of the sign box 100 can be pre-selected by the number and size of extrusion members 20,30 used to fabricate the sign box 100. An important feature of the invention is its efficient use of commercially available extrusion members to manufacture a sign box of any dimension and shape.

In addition, a sign box joining device 10 may include an elongated first top wall 14 having a pair of elongate downwardly extending side walls 16,17 integral to the first top wall, the side walls 16,17 being in a preselected relationship to one another and being at a preselected angle to the first top wall 14. In addition, the invention may include a pair of elongate inwardly extending flanges or bottom walls 18,19 integral to respective distal free ends of the side walls 16,17, the inwardly extending bottom walls 18,19 extending toward one another in a preselected relationship to the first top wall 14 and at preselected angles to the side walls 16,17.

In addition, a sign box joining device 10 includes an elongated first top wall 14 and a pair of elongate downwardly extending side walls 16,17 integral to opposite sides of the first top wall 14. The side walls 16,17 may also be parallel to one another and being at right angles to the first top wall.

In addition, a sign box joining device 10 for fabricating a sign box 100 with commercially available extrusion members 20,30 may include an elongated first top wall 14 having a pair of elongate conformal opposing side walls 16,17 that are integral to the first top wall. The side walls 16,17 are arranged at a preselected relationship to one another and arranged at a preselected angle to the first top wall 14. The joining device 10 conformably fills the space formed by two or more extrusion members 20,30 so that the joining device can engage and interlock the extrusion members 20,30 together to form a first sign box 100. A fastener 40 may be attached to any part of either the joining device 10 or the extrusion members 20,30 as required to further secure the components of the sign box 100.

The present invention may be embodied in other specific forms without departing from the spirit or essential attributes thereof and, accordingly, reference should be made to the appended claims, rather than to the foregoing specification, as indicating the scope of the invention.

What is claimed is:

1. A sign box joining arrangement, comprising:
   A) a sign box joining device having:
      an elongated first top wall;
      a pair of elongate downwardly extending side walls integral to of the first top wall, the side walls being parallel to one another and being at right angles to the first top wall to form a channel with the first top wall;
      a pair of elongate inwardly extending bottom walls integral to the side walls, the inwardly extending bottom walls extending toward one another in parallel to the first top wall and at right angles to the side walls and having free distal ends substantially within the channel; and
   B) a first extrusion member having:
      an elongate first bottom wall;
      first and second elongate upwardly extending side walls integral to the first bottom wall, the first and second side walls being parallel to one another and being at right angles to the first bottom wall;
      an elongate inwardly extending top wall integral to the first side wall, the inwardly extending top wall extending in parallel to the first bottom wall and at right angle to the first side wall; and
      an elongate outwardly extending top wall integral to the second side wall, the outwardly extending top wall extending in parallel to the first bottom wall and at right angle to the second side wall,
   wherein a portion of each of the first top wall, one of the downwardly extending side walls and one of the inwardly extending bottom walls of the joining device slidably engage and interlock respectively with a portion of each of the inwardly extending top wall, the second upwardly extending side wall, and the first bottom wall of the extrusion member.

2. The sign box joining arrangement according to claim 1, wherein the first top wall and the outwardly extending top wall each have an outer surface located in substantially the same plane forming a smooth continuous flat surface.

3. The sign box joining arrangement according to claim 1, wherein one of the downwardly extending side walls of the joining device abuts the second sidewall of the first extrusion member.

4. The sign box joining arrangement according to claim 1, wherein the first top wall and the outwardly extending top wall each have an outer surface located in substantially the same plane forming a smooth continuous flat surface.

5. The sign box joining arrangement according to claim 1, wherein one of the downwardly extending side walls of the joining device abuts the second sidewall of the first extrusion member.

6. The sign box joining arrangement according to claim 1, comprising a second extrusion member having:
   an elongate second bottom wall;
   a third and a fourth elongate upwardly extending side wall integral to the second bottom wall, the third and fourth side walls being parallel to one another and being at right angles to the second bottom wall;
   an elongate inwardly extending second top wall integral to the third side wall, the inwardly extending top wall extending in parallel to the second bottom wall and at a right angle to the third side wall; and
   an elongate outwardly extending top wall integral to the fourth side wall, the outwardly extending top wall extending in parallel to the second bottom wall and at a right angle to the fourth side wall,
   wherein a portion of each of the first top wall, one of the downwardly extending side walls and one of the upwardly extending bottom walls of the joining device slidably engage and interlock respectively with a portion of each of the inwardly extending second top wall, the fourth side wall, and the second bottom wall of the second extrusion member.

7. The sign box joining arrangement according to claim 6, wherein a portion of the first and the third side walls of the first and second extrusion members abut against each other.

8. The sign box joining arrangement according to claim 6, wherein the first and the third sidewalls of the first and the second extrusion members each include an outwardly extending surface that abut against each other.

9. The sign box joining arrangement according to claim 8, wherein the outwardly extending top wall of the first and the second extrusion members are coplanar with the first top wall of the joining device.

10. A sign box joining arrangement, comprising
    A) a sign box joining device having:
       an elongate first top wall;
       first and second elongate side walls integral to the first top wall, the first and second side walls being parallel to one another and being at right angles to the first top wall;
       first and second elongate inwardly extending bottom walls integral to the first and second side walls, the inwardly extending first and second bottom walls extending toward one another in parallel to the first top wall and at right angles to the first and second side walls; and
    B) a first extrusion member having:
       an elongate third bottom wall;
       third and fourth elongate side walls integral to the third bottom wall, the third and fourth side walls being parallel to one another and being at right angles to the third bottom wall;
       an elongate inwardly extending second top wall integral to the third side wall, the inwardly extending second top wall extending in parallel to the third bottom wall and at right angle to the third side wall; and an elongate outwardly extending third top wall integral to the fourth side wall, the outwardly extending third top wall extending in parallel to the third bottom wall and at a right angle to the fourth side wall, wherein a portion of first bottom wall, first side wall and first top wall of the joining device slidably engages and interlocks with a portion of the third bottom wall, the fourth side wall, and the inwardly extending second top wall of the first extrusion member.

11. The sign box joining arrangement according to claim 10, wherein the first extrusion member includes a fastener for fastening the first extrusion member with the joining device.

12. The sign box joining arrangement according to claim 11, wherein the fastener is one of the group consisting of a screw, rivet, adhesive, weld, and crimp.

13. The sign box joining arrangement according to claim 10, wherein the first top wall and the outwardly extending third top wall each have an outer surface located in substantially the same plane.

14. The sign box joining arrangement according to claim 10, wherein the first side wall of the joining device substantially abuts the fourth sidewall of the first extrusion member.

15. The sign box joining arrangement according to claim 10, comprising a second extrusion member having:

an elongate fourth bottom wall;

fifth and sixth elongate side walls integral to the fourth bottom wall, the fifth and sixth side walls being parallel to one another and being at right angles to the fourth bottom wall;

an elongate inwardly extending fourth top wall integral to the fifth side wall, the inwardly extending fourth top wall extending in parallel to the fourth bottom wall and at a right angle to the fifth side wall; and an elongate outwardly extending fifth top wall integral to the sixth side wall, the outwardly extending fifth top wall extending in parallel to the fourth bottom wall and at a right angle to the sixth side wall, wherein a portion of each of the second bottom wall, second side wall and top wall of the joining device slidably engage and interlock with a portion of the fourth bottom wall, the sixth side wall, and the inwardly extending fourth top wall of the second extrusion member.

16. The sign box joining arrangement according to claim 15, wherein the a portion of the third and fifth side walls of the first and the second extrusion members abut against each other.

17. The sign box joining arrangement according to claim 15, wherein the first top wall and the outwardly extending fifth top wall each have an outer surface located in substantially the same plane.

18. The sign box joining arrangement according to claim 15, wherein the first, the third and the fifth top wall each have an outer surface located in substantially the same plane forming a smooth continuous flat surface.

19. A sign box joining arrangement comprising:

A) a sign box joining device having:

an elongate top wall having downwardly extending side walls at opposite sides of the top wall and inwardly extending bottom walls at distal ends of the downwardly extending side walls; and B) a pair of extrusion members each having an elongate bottom wall having upwardly extending side walls at opposite sides of the bottom wall, one upwardly extending side wall having an inwardly extending top wall and the other upwardly extending side wall having an outwardly extending top wall, wherein the joining device slidably engages and interlocks the pair of extrusion members when a portion of the top wall of the joining device is in contact with a portion of the inwardly extending top wall of both extrusion members, a portion of each of the downwardly extending side walls of the joining device is in contact with a portion of opposite upwardly extending side walls of both extrusion members, and a portion of the inwardly extending bottom walls of the joining device is in contact with a portion of one of the bottom walls of the extrusion members.

20. The sign box joining arrangement according to claim 19, wherein each extrusion member includes a fastener for fastening each extrusion member with the joining device.

21. The sign box joining arrangement according to claim 20, wherein the fastener is one of a group consisting of a screw, rivet, adhesive, weld, and crimp.

22. The sign box joining arrangement according to claim 19, wherein the top wall and the outwardly extending top wall of each extrusion member have an outer surface located in substantially the same plane.

23. The sign box joining arrangement according to claim 19, wherein the downwardly extending side walls of the joining device substantially abut one of the upwardly extending sidewalls of the extrusion member.

24. The sign box joining arrangement according to claim 19, wherein a portion of the downwardly extending side walls of the joining device substantially abut a portion of one of the upwardly extending sidewalls of the extrusion member.

25. The sign box joining arrangement according to claim 19, wherein a portion of one of the upwardly extending side walls abut a portion of a second upwardly extending sidewall.

26. The sign box joining arrangement according to claim 19, wherein the top wall and at least one of the outwardly extending top walls of the extrusion member have an outer surface located in substantially the same plane.

* * * * *